United States Patent
O'Dowd et al.

[19]

[11] Patent Number: 6,147,528

[45] Date of Patent: Nov. 14, 2000

[54] METHOD OF INVOKING A POWER-DOWN MODE ON AN INTEGRATED CIRCUIT BY MONITORING A NORMALLY CHANGING INPUT SIGNAL

[75] Inventors: John O'Dowd; John Wynne, both of Limerick, Ireland

[73] Assignee: Analog Devices, Inc., Norwood, Mass.

[21] Appl. No.: 09/041,937

[22] Filed: Mar. 13, 1998

[51] Int. Cl.[7] .................................................. H03L 7/00
[52] U.S. Cl. ............................................. 327/142; 327/18
[58] Field of Search .............................. 327/18, 20, 142, 327/143, 165, 198

[56] References Cited

U.S. PATENT DOCUMENTS

| | | | |
|---|---|---|---|
| 4,350,975 | 9/1982 | Haque et al. | 340/347 |
| 4,434,403 | 2/1984 | Chang | 328/120 |
| 4,528,629 | 7/1985 | Breitling | 364/431.11 |
| 4,737,723 | 4/1988 | Mita | 328/120 |
| 4,847,782 | 7/1989 | Brown, Jr. et al. | 364/492 |
| 5,350,411 | 9/1994 | Ryan et al. | 607/32 |
| 5,523,708 | 6/1996 | Yamasaki | 327/20 |
| 5,619,204 | 4/1997 | Byrne et al. | 341/155 |
| 5,714,955 | 2/1998 | Reay et al. | 341/155 |
| 5,739,708 | 4/1998 | LeWalter | 327/143 |

OTHER PUBLICATIONS

"Complete SO–8, 12–Bit, 400ksps ADC with Shutdown", (LTC 1400), Linear Technology, May 1996.
"Single/Dual, +3V/+5V Dual–Speed Comparators with Auto–Standby", (MAX975/MAX977), Maxim, Sept., 1996.
"+3.OV to +5.5V, 1 uA, up to 250kbps, True RS–232 Transceiver with AutoShutdown Plus", (MAX3238), Maxim, Sept., 1996.

*Primary Examiner*—Jeffrey Zweizig
*Attorney, Agent, or Firm*—Wolf, Greenfield & Sacks, PC

[57] ABSTRACT

An integrated circuit comprises means responsive to a normally changing signal at an input of the integrated circuit to implement a primary function of the circuit, and means for monitoring this normally changing signal at the input in question of the integrated circuit. This monitoring means is responsive to suspension of the normally changing signal to communicate a signal for implementation of a secondary function of the circuit. In an exemplary embodiment, the invention is directed towards implementation of power-down of the circuit, without using an explicit power-down or reset pin. An input signal which normally changes at minimum rate, e.g. preferably a clock signal, is held in a fixed state for a minimum duration to invoke the reset or power-down mode. An integrated circuit may thus be powered-down or reset where no explicit power-down or reset pin is available.

20 Claims, 2 Drawing Sheets

METHOD OF INVOKING A POWER-DOWN MODE ON AN INTEGRATED CIRCUIT BY MONITORING A NORMALLY CHANGING INPUT SIGNAL

BACKGROUND OF THE INVENTION

1. Field of the Invention

This invention relates to integrated circuits and more particularly to a method of invoking a power-down or reset mode on an integrated circuit.

2. Description of the Prior Art

In modern electronic systems, there is an increasing awareness of the need for or desirability of power conservation for many applications. Such systems require that their components have very low power consumption, or that the system have a power-down or standby mode where the power consumption can be reduced when the components are not in use. A signal must be received by these components to invoke this power-down or standby mode. Integrated circuits (IC) for such systems are generally contained in packages having standardized pin layouts, such as 16 pin dual in line (DIP), 8 pin DIP, pin grid arrays etc., with costs generally proportional to the number of pins, and with every pin utilized. Frequently, such power sensitive applications are also size-sensitive, as for example, in the case of portable equipment. The number of pins is usually limited on smaller packages, so that it may not be possible to have a dedicated power-down pin on the component. In such cases, it is required for the power-down or standby circuit to share a pin with another function.

One method of enabling a single device input pin to share two signals is to use multiple logic levels as described in pending U.S. patent application Ser. No. 08/627,504 of Ashe et al, filed Apr. 4, 1996, issued Feb. 3, 1998 as patent assigned to Analog Devices Inc., entitled "A three state logic input," incorporated by reference. Standard logic signals have two states—high (typically +5V) and low (typically 0V). By using a third level between these two (or even above logic high or below logic low), an additional signal, such as a power-down request, can be transmitted to the part. This arrangement presents some limitations. Firstly, the main signal on the pin (using the standard logic levels) must be inactive when the additional signal is being asserted. This is not however a problem if the additional signal is a power-down request, as most other signals would be ignored during power-down. Secondly, the arrangement requires additional circuitry—a window comparator to detect the presence of the new logic level, and also some form of timer circuit to determine if and when the new logic level has been asserted, and ensure that the comparator is not simply responding to a normal transition between two standard logic levels. Thirdly, a third logic level can be difficult to generate. A convenient manner of providing the third logic level is to have a weak voltage divider on the component between its supplies, which pulls the pin to the third logic level if the input is floated, but otherwise allows the input to be driven as normal. However, adding such a circuit may cause problems for inputs that are sensitive to impedance, such as a pin used for an external clock in/crystal oscillator function.

A second method of sharing signals to execute the power-down function has been used by Linear Technology Corp. This uses a combination of special sequencing on one pin plus holding a clock pin low to put a circuit in one of two power-down modes. A disadvantage of this system is that extra complexity is added to the application system by virtue of the need to apply this special sequencing, while also, since the circuit uses a combination of signals to invoke the power-down, there is an intrinsic requirement for two pins to be utilized. As noted above, this is not always a possibility, especially where package sizes are small and the number of pins available is limited.

A third method of implementing low power operation has been used by Maxim Integrated Products in a system which switches between a high speed comparator and a low speed power saving comparator. The input to the circuit is monitored. When no input signal is detected, operation is automatically switched from a high speed comparator to a low power comparator, which reduces the power consumption of the circuit. When the input signal becomes active again, the comparator is switched back to high speed operation. The method provides a power saving operation only and its implementation is dependent on the input signal.

BRIEF SUMMARY OF THE INVENTION

It is an object of the present invention to minimise the complexity and size of the circuitry required to implement a secondary function on an integrated circuit. It is a further object of the invention to achieve this reduced complexity by temporarily disabling a primary function of a chip, thus allowing a secondary function to be implemented.

The present invention is specifically directed towards implementation of secondary functions, such as powerdown or reset of an integrated circuit, without using an explicit powerdown or reset pin. An input signal, which normally repeats at a minimum rate, is held in a fixed state for a minimum duration to invoke the reset or powerdown mode. In this way, the number of pins required to invoke secondary functions can be reduced.

In a favoured embodiment, the invention provides for a shared functionality between the powerdown mode and the clock (CLK) pin. In alternative embodiments, any other input pin which changes state with predictable regularity during normal operation may also be used. According to the invention, the pin is held in a constant state for a period of time longer than it normally would be, this extended constant state is detected, and the powerdown mode is thus invoked. Any resumption of the toggling of the pin terminates the powerdown mode and restores normal operation of the circuit, i.e. implementation of its primary function.

In the preferred embodiment, the pin is held in the low state in the absence of the normally repeating signal, although the high state could alternatively be used. The low state is preferred for the reason that under conditions of supply fluctuation, a logic low state is easier to detect reliably than a logic high.

Accordingly the invention provides in a first aspect, an integrated circuit having a plurality of pins, to at least one of which a functional input signal may be applied, and to another of which a normally changing signal may be applied, wherein a primary function of the circuit is implemented in the presence of said normally changing or repeating signal at said another of said plurality of pins, and a secondary function of the circuit is implemented by suspension of said normally repeating signal.

Said normally changing, repeating or cyclic signal at said another of said plurality of pins is preferably for clock or synchronising purposes. Individual usage of each pin of the plurality of pins varies with application and design of an integrated circuit. Common examples of such pin usage include an input voltage, an output voltage, a positive supply pin, a ground pin, and a reference voltage.

Preferably the implementation of said secondary function is terminated by resumption of said normally repeating signal. The presence of said normally repeating signal may suitably be monitored by a self-contained timing circuit, while the implementation of said primary function may be terminated by suspension of said normally repeating signal.

The secondary function may be selected from one or more of the following modes;

a) a powerdown mode, b) a reset mode, c) a test mode.

Said another of said plurality of pins is preferably a clock pin of the integrated circuit and said normally changing or repeating signal may then comprise a clock signal applied to said clock pin.

In a second aspect, the invention provides an integrated circuit comprising:

(a) means responsive to a signal applied to a first input of the integrated circuit to effect a required circuit operation, (b) means responsive to a normally changing signal applied to a second input of the integrated circuit to enable implementation of a primary function of the circuit, and (c) means for monitoring said normally changing signal at said second input of the integrated circuit, said monitoring means being responsive to suspension of said normally changing signal to communicate a signal for implementation of a secondary function of the circuit.

In an alternative arrangement, an integrated circuit according to the invention may comprise (a) means responsive to a signal applied to a first input of the integrated circuit to effect a required circuit operation, and (b) means for monitoring said normally changing signal applied to a second input of the integrated circuit, a primary function of the circuit being implemented in the presence of said normally changing signal, and said monitoring means being responsive to suspension of said normally changing signal to communicate a signal for implementation of a secondary function of the circuit.

Preferably said monitoring means is responsive to resumption of said normally changing signal at said second input of the integrated circuit to terminate implementation of said secondary function.

Said monitoring means preferably comprises a self-contained timing circuit, and said another of said plurality of pins may be a clock pin of the integrated circuit and said normally changing signal comprises a clock signal applied to said clock pin.

In a third aspect the invention provides integrated circuit comprising:

(a) means responsive to a signal applied to a first input of the integrated circuit to effect a required circuit operation, (b) means responsive to a normally changing signal applied to a second input of the integrated circuit to enable implementation of a primary function of the circuit, and (c) means responsive to suspension of said normally changing signal to enable implementation of a secondary function.

The integrated circuit of the invention may alternatively comprise (a) means responsive to a signal applied to a first input of the integrated circuit to effect a required circuit operation, and (b) means responsive to a normally changing signal applied to a second input of the integrated circuit to enable implementation of a primary function of the circuit in the presence of the normally changing signal, and responsive to suspension of said normally changing signal to enable implementation of a secondary function.

Preferably said means responsive to suspension of said normally changing or repeating signal is further responsive to resumption of said normally repeating signal to terminate implementation of said secondary function, The integrated circuit of this third aspect of the invention may also optionally comprise a self-contained timing circuit for monitoring the presence of said normally repeating signal.

In this third aspect also, said means responsive to said normally changing signal to implement said primary function may also be responsive to termination of said normally changing signal to terminate implementation of said primary function.

The invention also extends to an integrated circuit having a primary function and a secondary function, wherein the secondary function is selected from one of the following modes:

(a) a powerdown mode (b) a reset mode, and is implemented by temporary suspension of a clock signal applied to a clock input of the circuit.

In a method according to the invention of implementing a secondary function of an integrated circuit having a plurality of pins, to at least one of which a functional input signal may be applied and to another of which a normally repeating signal may be applied, the method comprises the steps of:

(a) monitoring the presence of said normally repeating signal at said another of said plurality of pins, (b) implementing a primary function of the circuit in the presence of said normally repeating signal, (c) implementing a secondary function of the circuit in the absence of said normally repeating signal, and (d) terminating the implementation of said secondary function on resumption of said normally repeating signal.

Said period of absence of said normally repeating signal may be established by holding said another of said plurality of pins in a logic low state. Preferably, in a circuit in which said normally repeating signal is a clock signal, said period of absence of said clock signal is established by holding said another of said plurality of pins in a logic low state for a duration longer than the normal clock low interval.

These and other features, aspects and advantages of the invention will be apparent to those skilled in the art from the following detailed description, taken together with the accompanying drawings.

DETAILED DESCRIPTION OF THE DRAWINGS

Figure 1:
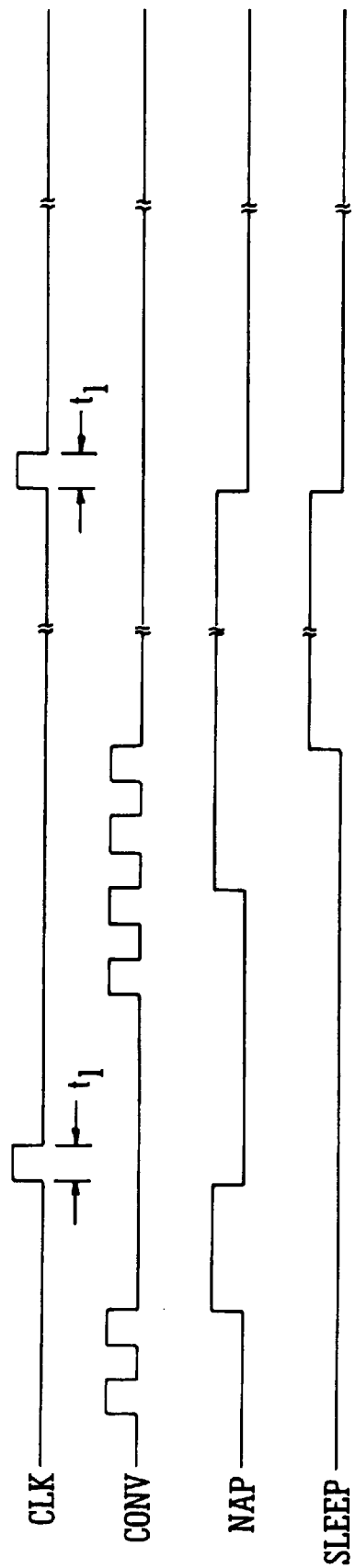
FIG. 1 is a timing diagram for a prior art system using two pins to implement a sleep mode.

FIG. 1 shows a known method to power down an electronic system including an integrated circuit. The chip, in this case an LTC 1400, as manufactured by Linear Technology Corporation, may be powered down to one of two modes: nap and sleep. For 'nap' mode, the CLK pin is kept low and the CONV pin is pulsed twice. For 'sleep' mode, the CLK pin is kept low and the CONV pin pulsed four times. For a resumption to normal power, the CLK pin is pulsed. It will be apparent from FIG. 1 that two pins are therefore required for powering down the chip. The functionality of pins on an integrated circuit varies with application, examples including a positive supply voltage, a ground reference, a reference voltage, an output pin and an input pin.

Figure 2:
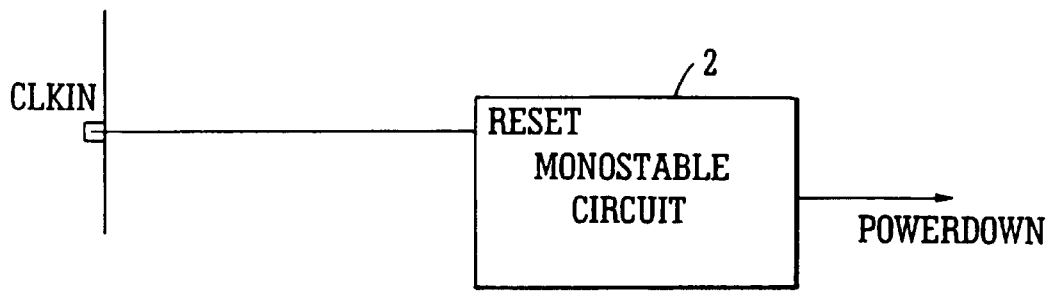
FIG. 2 is a schematic diagram of a power down circuit according to a preferred embodiment of the present invention.

FIG. 2 shows a preferred embodiment of a circuit in accordance with the invention. The CLKIN pin is held low for a period longer than the normal clock low interval to invoke a powerdown. A monostable timing circuit 2 is connected to the CLKIN pin. The monostable detects the presence of a clocking signal and generates an active output some time period $t_{delay}$ after its reset line is released, unless another reset occurs. In this embodiment, the reset of the monostable 2 is connected to the CLKIN pin. As long as the edges on the CLKIN pin occur with a period less than $t_{delay}$, the monostable 2 will be reset before its output can go high. Monostable 2 hence remains inactive under these conditions. However, if the CLKIN pin is held low for any time greater than $t_{delay}$, then the monostable output becomes active, forcing a powerdown. The monostable circuit 2 itself is not powered down, as it must remain in control of the power status. The output signal from the monostable 2 remains active until a rising transition on CLKIN forces a reset of the monostable, and thus deactivates the powerdown signal.

Figure 3:
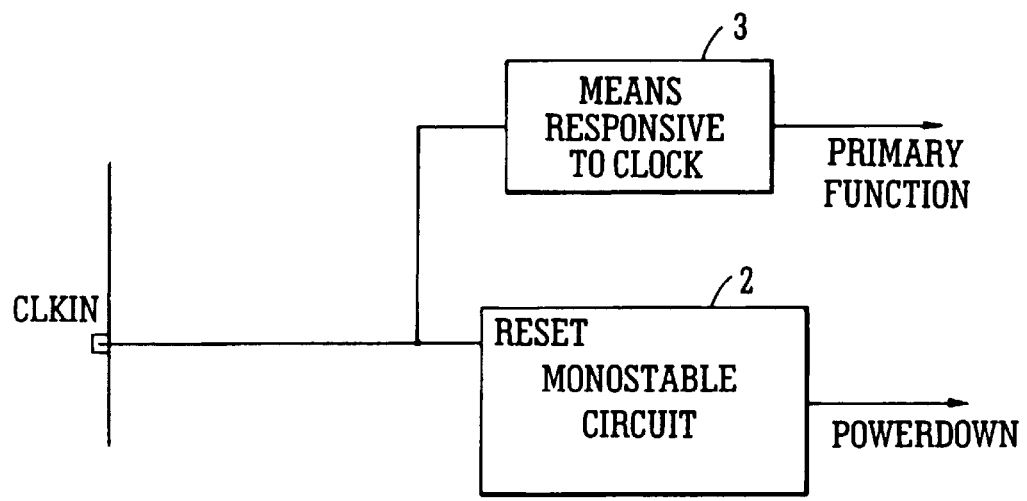
FIG. 3 is an augmentation of the circuit of FIG. 2, showing an arrangement in which a clock-responsive means is connected upstream of the monostable of FIG. 2.

FIG. 3 illustrates an alternative manner in which the active output or primary function of the circuit embodying the powerdown feature according to the present invention may be implemented. As shown in FIG. 3, means 3 responsive to the clock signal is connected to the input to the monostable 2 upstream of the monostable. Means 3 is active in the presence of the clock signal to implement the primary function or active output of the circuit.

Figure 4:
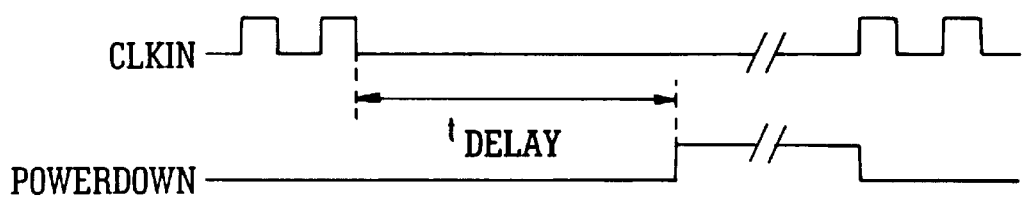
FIG. 4 is a timing diagram for the preferred embodiment of the invention as shown in FIG. 2 or FIG. 3.

A timing diagram is shown in FIG. 4 and illustrates the relationship between the CLKIN signal and the powerdown signal for the embodiments of any of FIGS. 2 and 3. A powerdown is implemented if no rising edge pulse from the CLKIN is detected within a period less than $t_{delay}$. As detailed above, a rising transition on the CLKIN pin forces a reset of the monostable 2, thus deactivating the powerdown signal.

The embodiment outlined above utilizes a shared functionality with the CLKIN pin to invoke a power down mode. Any other input pin which changes state with predictable regularity during normal operation could also be used, i.e. any pin to which a normally repeating or changing cyclic signal such as a clock or synchronizing pulse is applied. To initiate powerdown, the pin is held in a constant state for a period longer than the longest constant period which occurs in normal operation. This extended constant state status is detected and invokes the powerdown mode. Resuming toggling of the pin reverses conditions and removes operation from the powerdown mode. The pin may be held in either the high or a low state to establish powerdown, but in the preferred embodiment the low state is used, because in situations of supply fluctuation, (e.g. supply ramping up or down), a logic low state is easier to detect reliably than a logic high state. The detection circuitry is not restricted to a monostable, as any other circuit capable of differentiating between the timing of normal operation signals and signals implemented for a specific purpose may also be used.

In the preferred embodiment described, the signal generated by monostable 2 is used to invoke a powerdown mode, but it could be equally used to invoke a reset mode, a test mode or any other secondary function not requiring normal operation of the circuit. Although generally intended for use within an integrated circuit itself, the signal generated according to the invention may also be made available as a pin or lead of the package for use in electrical circuitry outside the package.

The benefits to electronics systems of reduced power consumption are many and include lower operating costs, increased reliability and greater flexibility. Reduction in power consumption is particularly important in equipment depending on battery power, as the diminished power requirements decrease the load on the battery with consequent extension of battery running time and reduction in the size and weight of the electronics system. Such savings and advantages are particularly pertinent for portable systems. Extensive discussion of low-power design techniques is provided in Paul Horowitz and Winfield Hill, "The Art of Electronics", Cambridge University Press Press, New York, 1994 at pages 917–985.

The present invention is based on the fact that the clock need not be present during power-down. Operating on a binary logic principle, the present invention is easier to implement than methods requiring ternary logic states. The present invention requires only the addition of a simple timer circuit. In comparison with the methods involving dual pin interaction, the present invention represents a significant improvement in that no special signal sequences are required. Only one pin is used, rather than the two pins of certain prior art arrangements, thus simplifying the applications circuit, especially if the device in question is being operated remotely from the remainder of the circuit. With an internal timer circuit pre-implemented on the integrated circuit, the user requirement is merely to pull the clock low, for example by addition of an external logic gate, such as an AND or OR gate.

The foregoing description of a specific embodiment of the invention has been presented for the purpose of illustration and description. It is not intended to be exhaustive or to limit the invention to the precise forms disclosed, and many modifications and variations are possible in the light of the preceding teachings. The embodiment was chosen and described in order to best explain the principles of the invention and its practical application, such that others skilled in the art would be enabled to best utilize the invention. It is intended that the scope of the invention be limited only by the claims appended hereto.

What is claimed is:

1. An integrated circuit having a plurality of pins, to at least one of which a functional input signal is applied, and to another of which a normally repeating signal is applied:

wherein normal operation of the circuit is implemented in the presence of said normally repeating signal at said another of said plurality of pins, and a reduced power consumption mode of operation of the circuit is implemented by suspension of said normally repeating signal.

2. The integrated circuit of claim 1, wherein implementation of said reduced power consumption mode of operation is terminated by resumption of said normally repeating signal.

3. The integrated circuit of claim 1, wherein the presence of said normally repeating signal is monitored by a self-contained timing circuit.

4. The integrated circuit of claim 1, wherein implementation of said normal operation is terminated by suspension of said normally repeating signal.

5. The integrated circuit of claim 1, wherein said another of said plurality of pins is a clock pin of the integrated circuit and said normally repeating signal comprises a clock signal applied to said clock pin.

6. An integrated circuit having a plurality of pins, to at least one of which a functional input signal is applied, and to another of which a normally repeating signal is applied, normal operation of the circuit being implemented in the presence of said normally repeating signal, and a reduced power consumption mode of operation being implemented by suspension of said normally repeating signal, wherein,
(1) said reduced power consumption mode of operation is terminated by resumption of said normally repeating signal,
(2) said another of said plurality of pins is a clock pin of the integrated circuit, and
(3) said normally repeating signal comprises a clock signal applied to said clock pin.

7. An integrated circuit comprising:
(a) means responsive to a signal applied to a first input of the integrated circuit to effect a required circuit operation,
(b) means responsive to a normally changing signal applied to a second input of the integrated circuit to enable implementation of normal operation of the circuit, and
(c) means for monitoring said normally changing signal at said second input of the integrated circuit, said monitoring means being responsive to suspension of said normally changing signal to communicate a signal for implementation of a reduced power consumption mode of operation of the circuit.

8. The integrated circuit of claim 7, wherein said monitoring means is responsive to resumption of said normally changing signal at said second input of the integrated circuit to terminate implementation of said reduced power consumption mode of operation.

9. The integrated circuit of claim 7, wherein said monitoring means comprises a self-contained timing circuit.

10. The integrated circuit of claim 7, wherein said means responsive to said normally changing signal is responsive to termination of said normally changing signal to terminate implementation of said normal operation.

11. The integrated circuit of claim 7, wherein said another of said plurality of pins is a clock pin of the integrated circuit and said normally changing signal comprises a clock signal applied to said clock pin.

12. An integrated circuit comprising:
(a) means responsive to a signal applied to a first input of the integrated circuit to effect a required circuit operation,
(b) means responsive to a normally changing signal applied a second input of the integrated circuit to enable implementation of normal operation of the circuit, and
(c) means responsive to suspension of said normally changing signal to enable implementation of a reduced power consumption mode of operation.

13. The integrated circuit of claim 12, wherein said means responsive to suspension of said normally changing signal is further responsive to resumption of said normally changing signal to terminate implementation of said reduced power consumption mode of operation.

14. The integrated circuit of claim 12, comprising a self-contained timing circuit for monitoring the presence of said normally changing signal.

15. The integrated circuit of claim 12, wherein said means responsive to said normally changing signal to enable implementation of said normal operation is responsive to suspension of said normally changing signal to terminate implementation of said normal operation.

16. The integrated circuit of claim 12, wherein said second input of the integrated circuit is a clock pin and said normally changing signal comprises a clock signal applied to said clock pin.

17. An integrated circuit comprising:
(a) means responsive to a signal applied to a first input of the integrated circuit to effect a required circuit operation,
(b) means responsive to a normally changing signal applied to a second input of the integrated circuit to enable implementation of normal operation of the circuit, and
(c) means responsive to suspension of said normally changing signal to enable implementation of a reduced power consumption mode of operation of the circuit, wherein
(i) said means responsive to suspension of said normally changing signal is further responsive to resumption of said normally changing signal to terminate implementation of said reduced power consumption mode of operation,
(ii) said second input of the integrated circuit is a clock pin, and
(iii) said normally changing signal comprises a clock signal applied to said clock pin.

18. A method of implementing a reduced power consumption mode of operation of an integrated circuit having a plurality of pins, to at least one of which a functional input signal is applied and to another of which a normally repeating signal is applied, the method comprising the steps of:
(a) monitoring the presence of said normally repeating signal at said another of said plurality of pins,
(b) implementing normal operation of the circuit in the presence of said normally repeating signal,
(c) implementing a reduced power consumption mode of operation of the circuit in the absence of said normally repeating signal, and
(d) terminating the implementation of said reduced power consumption mode of operation on resumption of said normally repeating signal.

19. A method according to claim 18, wherein a period of absence of said normally repeating signal is established by holding said another of said plurality of pins in a logic low state.

20. A method according to claim 18, wherein said normally repeating signal is a clock signal and a period of absence of said clock signal is established by holding said another of said plurality of pins in a logic low state for a duration longer than the normal clock low interval.

* * * * *